US012680841B2

(12) United States Patent (10) Patent No.: US 12,680,841 B2
Boretti et al. (45) Date of Patent: Jul. 14, 2026

(54) BEZEL FOR A MULTI-SENSOR DEVICE

(71) Applicant: SCHNEIDER ELECTRIC BUILDINGS AMERICAS, INC., Carrollton, TX (US)

(72) Inventors: David John Boretti, Salem, NH (US); Goran Stojcevski, Malmo (SE); Pierre François Veuillet, Voiron (FR)

(73) Assignee: SCHNEIDER ELECTRIC BUILDINGS AMERICAS, INC., Carrollton, TX (US)

( * ) Notice: Subject to any disclaimer, the term of this patent is extended or adjusted under 35 U.S.C. 154(b) by 263 days.

(21) Appl. No.: 18/127,755

(22) Filed: Mar. 29, 2023

(65) Prior Publication Data

US 2023/0314190 A1 Oct. 5, 2023

Related U.S. Application Data

(60) Provisional application No. 63/325,237, filed on Mar. 30, 2022.

(51) Int. Cl.
 G01D 11/24 (2006.01)
 G01D 11/30 (2006.01)
(52) U.S. Cl.
 CPC .......... G01D 11/245 (2013.01); G01D 11/30 (2013.01)
(58) Field of Classification Search
 CPC .............................. G01D 11/30; G01D 11/245
 See application file for complete search history.

(56) References Cited

U.S. PATENT DOCUMENTS

| 10,683,677 | B1 * | 6/2020 | Funamura | ............. | E05B 17/226 |
| 2017/0082586 | A1 * | 3/2017 | Williamson | ....... | G01N 33/0022 |
| 2019/0120714 | A1 * | 4/2019 | Pusheck | ................ | G01L 19/144 |
| 2021/0100533 | A1 * | 4/2021 | Seres | ........................ | A61B 5/42 |
| 2021/0168958 | A1 * | 6/2021 | Choi | ...................... | H05K 5/069 |

FOREIGN PATENT DOCUMENTS

EP 3032640 A1 6/2016

OTHER PUBLICATIONS

V-Count Ultima AI—Precise All In One, Plug and Play, 2 pages (2021).
Einpresswire, V-count Launches Ultima AI: The Ultimate People Counting Sensor; Press Release—https://einpresswire.com/article/532311989, 3 pages (Dec. 8, 2020).
European Search Report and Search Opinion dated Aug. 3, 2023 for European Patent Application No. EP23163408.0, 14 pages.

* cited by examiner

*Primary Examiner* — Jamel E Williams
(74) *Attorney, Agent, or Firm* — Kinney & Lange, P.A.

(57) ABSTRACT

A bezel is provided for a multi-sensor device having a cover and a printed circuit board including a plurality of sensors. The bezel comprises a soft, flexible or resilient body including a first side and a second side, and a plurality of openings for the plurality of sensors or components thereof. The plurality of openings extend between the first and second sides. The first side is adjacent to the cover, and the second side is adjacent to the printed circuit board. The body can be a gasketing body to prevent unwanted materials from entering the housing of the multi-sensor device, and to dampen unwanted vibrations.

20 Claims, 10 Drawing Sheets

BEZEL FOR A MULTI-SENSOR DEVICE

RELATED APPLICATION

The present application claims priority to U.S. Provisional Patent Application Ser. No. 63/325,237, filed on Mar. 30, 2022 and entitled BEZEL FOR A MULTI-SENSOR DEVICE, which is incorporated by reference herein in its entirety.

TECHNICAL FIELD

The present disclosure relates to an assembly for a multi-sensor device, and more particularly, to a bezel for a housing assembly of a multi-sensor device including a plurality of sensors.

BACKGROUND

Sensor devices are used in many applications, and can contain sensitive sensor elements which are easily affected by their environment. For example, sensor devices may suffer problems relating to their sensor elements being damaged or having reduced performance due to exposure to unwanted vibrations and/or unwanted materials such as dust or other unwanted particles which may enter a device enclosure.

SUMMARY

In accordance with an embodiment, a bezel is provided for a multi-sensor device having a cover and a printed circuit board including a plurality of sensors. The bezel comprises a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board.

In an embodiment, the body can comprise a gasketing body, the gasketing body or portions thereof being configured to engage the cover and the printed circuit board or components thereof to form a seal therebetween. The gasketing body can be further configured to dampen unwanted vibrations when sandwiched between the cover and printed circuit board.

In another embodiment, the body can include one or more gasket rings defining an end of a sound sensor opening from the plurality of openings on the second side, the one or more ring gaskets being configured to surround a sound sensor from the plurality of sensors on the printed circuit board and to dampen unwanted vibrations around the sound sensor. The sound sensor opening can have a cone-shape which tapers from the first side to the second side, the cone-shape of the sound sensor opening being configured to direct and amplify sound to the sound sensor.

In a further embodiment, the body can include a projecting edge or flange and a front protrusion on the first side, the front protrusion including the plurality of openings and being configured to extend through a bezel opening on the cover, the projecting edge or flange being configured to engage a back portion of the cover around the bezel opening to form a seal therebetween. The protrusion and the bezel opening can have an oval-shape.

In another embodiment, the body can include a tempera- ture regulating gasket defining one of the plurality of open- ings, the temperature regulating gasket regulating a temperature around a thermal sensor from the plurality of sensors which is arranged in the one of the plurality of openings in order to facilitate temperature calibration of the thermal sensor when the temperature regulating gasket is engaged against the printed circuit board around the sensor.

In yet another embodiment, the body can be made of a thermoplastic elastomer or rubber-like material. Each of the plurality of openings can have a different size and shape for a different-type of sensor. The body can be formed as a unitary-piece or single-piece. The plurality of openings can include at least an opening for a sound sensor, an opening for a thermal sensor and an opening for a light sensor.

In another embodiment, the opening for the light sensor can have a size and shape which is configured to receive and retain a lens therein over a light sensor from the plurality of sensors, the opening for the light sensor further including a field of view through-hole, positioned under the lens, which has a size and shape to control an amount of light to be received by the light sensor. The body further can comprise a keying or poka-yoke component for alignment when assembling the body of the bezel in a housing of the multi-sensor device.

In accordance with another embodiment, a multi-sensor device can comprise: a housing assembly including a cover having at least a first cover opening; a printed circuit board including a plurality of sensors arranged at different loca- tions on the printed circuit board; and a bezel described herein.

In a further embodiment, the bezel can have a protrusion which includes the plurality of openings for the plurality of sensors and extends through the first cover opening, the bezel being configured to form a seal with the cover, and with the printed circuit board and/or one or more of the plurality of sensors. The housing assembly can further include a base for housing the printed circuit board, the bezel can include a keying component, and the base can include a counterpart keying component for receiving the keying component of the bezel such that each of the plurality of openings is aligned with a respective sensor from the plurality of sensors on the printed circuit board when the keying component is engaged to the counterpart keying component. The counterpart keying component can com- prise a receptacle with a male tab or prong, and the keying component comprises at least one plug for receiving the male tab or prong.

In another embodiment, the cover can further include a second cover opening for an additional sensor and a third opening for a button or light guide, the additional sensor and/or the button or light guide being in-line with at least two sensors from the plurality of sensors to provide a visual center-line to facilitate installation on a wall or structure. The bezel can be colored to camouflage the plurality of sensors or components related thereto which are visible through the cover.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to a bezel for a housing assembly of a multi-sensor device. In an embodiment, the bezel can include a plurality of sensor openings for corresponding sensors on a printed circuit board (PCB) which is housed in the multi-sensor device, and can be formed of a soft, flexible and/or resilient material such as thermoplastic elastomer or other rubber/rubber-like material. When the bezel is assembled between a cover (e.g., cover, cover plate, etc.) and the printed circuit board of the multi-sensor device, the body of the bezel (or surfaces thereon) provides a gasketing effect around one or more components of the multi-sensor device to protect them or other components housed in the device from unwanted materials entering the device housing from the external environment (e.g., dust, debris, etc.). The bezel or portions thereof also can provide a dampening effect against unwanted vibrations, which may impact the performance and/or the structure/parts of the sensors and other components in the multi-sensor device.

Accordingly, the bezel can address different requirements for each sensor technology being deployed in the multi-sensor device to increase or maximize efficiency in their performance or to reduce or minimize degradation in their performance. Such an arrangement also can enhance longevity of the multi-sensor device and increase sensor performance at a reduced cost compared to existing systems by selectively gasketing susceptible sensor and/or components within a multi-sensor device housing.

In various embodiments, the multi-sensor device can be a monitoring device for monitoring environmental conditions and/or activities in one or more regions. For example, the sensors of the multi-sensor device can be used to identify the presence (or absence) of people in a region, the number of people in a region, and so forth. The information provided by the monitoring device(s) can be used in a security system, an environmental control system for a building or other facility, or so forth.

In various embodiments, the bezel can be designed for ease of installation during the device assembly process. For example, the bezel can be keyed (e.g., Poka-yoke) to be self-locating/self-aligning, and can remain secured in the device assembly without the need of additional hardware, thereby saving time and reducing the overall cost of the product.

Examples of these and other features of the bezel and other components of the multi-sensor device of the present disclosure are described below with reference to the example figures.

Figure 1:
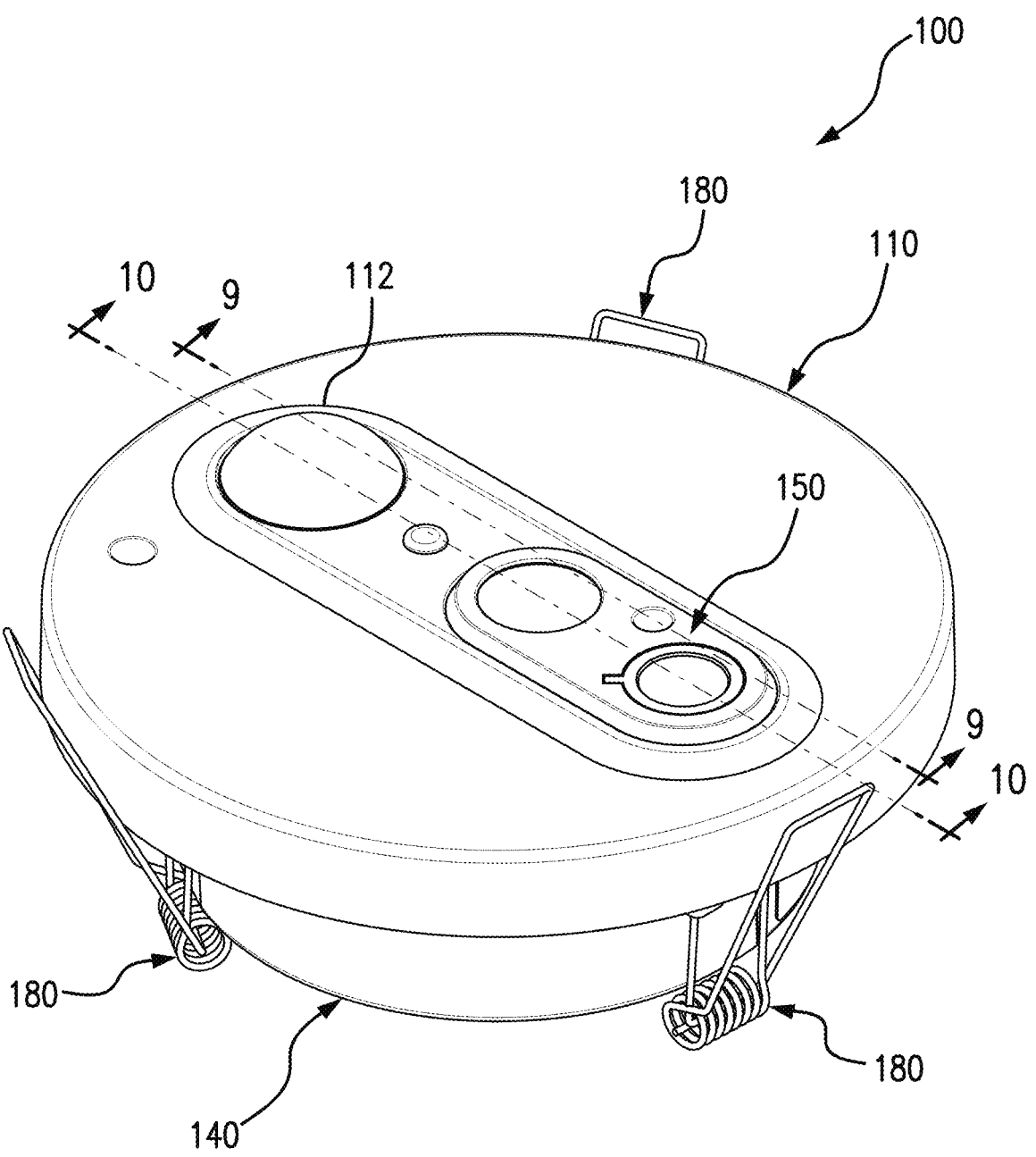
FIG. 1 is a perspective view of an example of a multi-sensor device with a housing assembly including a bezel and a spring mounted assembly, in accordance with an embodiment.

FIG. 1 is an example of an assembled multi-sensor device 100, in accordance with an embodiment. The multi-sensor device 100 includes a housing assembly (e.g., housing, enclosure, etc.) for housing various components of the multi-sensor device, including a plurality of sensors (also referred to as "sensor device(s)"). The housing assembly can include a cover 110, a base 140 and a bezel 150. The cover 110 can include a raised portion 112 having a plurality of openings, such as for the bezel 150 and various sensors (or components related thereto). The raised portion 112 can have an oval shape, and extend along a center-line of the cover 110. In this example, the multi-sensor device 100 includes one or more mounting springs 180 for mounting the multi-sensor device 100 onto a structure, such as a wall (e.g., ceiling, ceiling tile/panel, or side wall, etc.) or other structure. The cover 110 and base 140 can be formed of plastic or other suitable materials.

Figure 2:
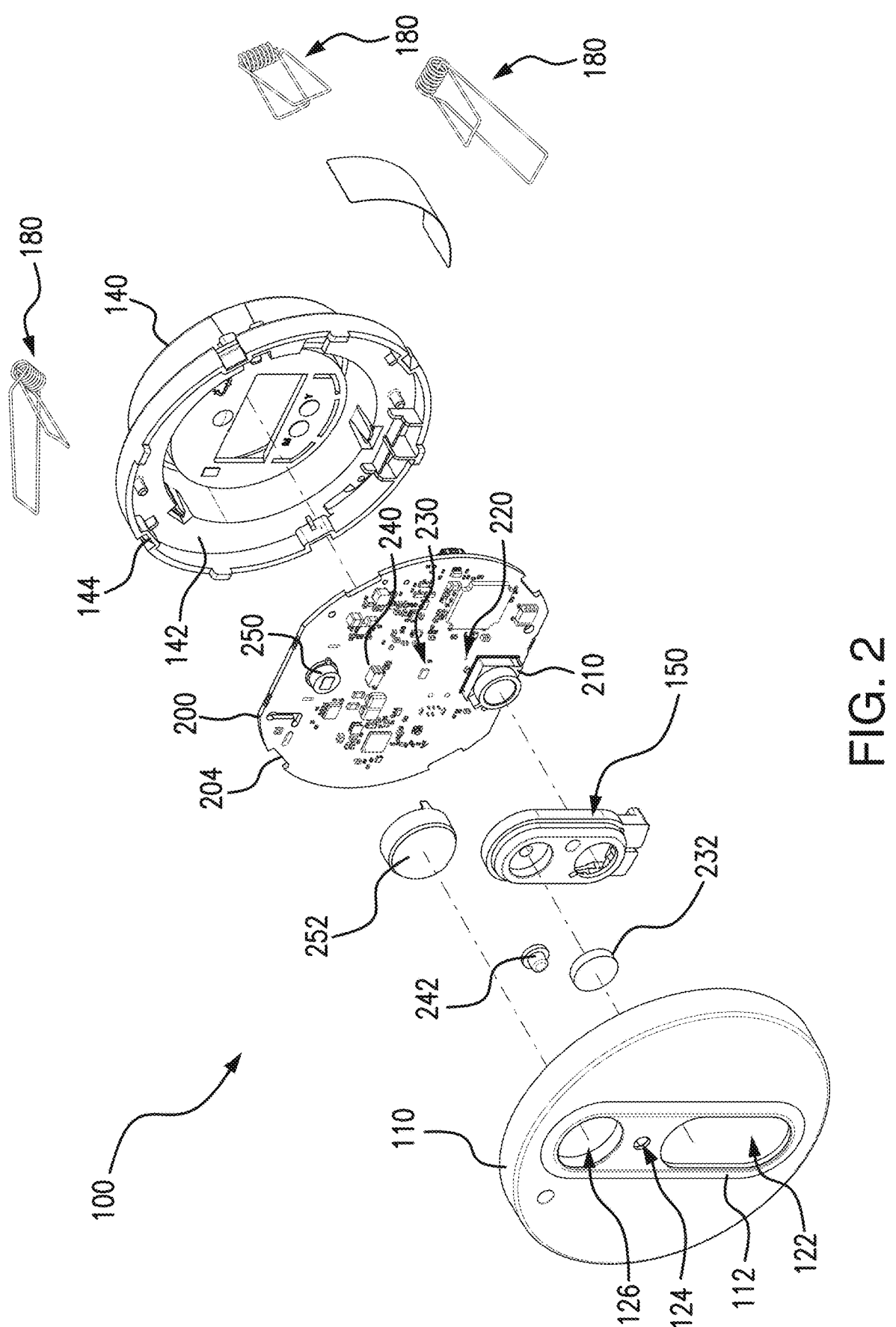
FIG. 2 is an expanded view of example components of the multi-sensor device in FIG. 1, in accordance with an embodiment.

As further shown in the expanded view of the multi-sensor device 100 in FIG. 2, the multi-sensor device 100 can include at least one printed circuit board (PCB) 200, which is housed in the base 140. The base 140 can include a ledge 142 for supporting the PCB 200, and a plurality of spaced-apart guides 144 (e.g., extending wall portion, etc.) for receiving respective spaced-apart recessed edge portions 204 of the PCB 200. Such a configuration can provide a poka-yoke feature when installing the assembly of the PCB 200 in the base 140 to ensure proper installation of the PCB 200 in a correct direction in the base 140. A plurality of pins (e.g., two pins) also may be provided to further facilitate such an installation.

The PCB 200 includes a plurality of sensors and other components arranged at various locations on the PCB 200. In this example, the sensors can include a thermal sensor 210 (e.g., a thermal imager, etc.), a sound sensor 220 (e.g., microphone, etc.), a light sensor 230 (e.g., an ambient light sensor, etc.) and a motion sensor 250 (e.g., infra-red (IR)

sensor, etc.) and other sensors. The other sensors can include sensors, such as a temperature sensor(s), for calibrating components on the PCB 200, including but not limited to the thermal sensor 210. The other components can include a reset switch and/or light guide, generally shown as reference number 240. The other electronic components can include processor(s) for controlling the components and operations of the multi-sensor device, communication interface for conducting wireless and/or wireline communication with other devices, bus(es), and so forth.

As further shown in FIG. 2, the multi-sensor device 100 also includes a lens 252 (e.g., a Fresnel lens) for the motion sensor 250, a push button 242 for the reset switch or light guide 240, and a lens 232 for use with the light sensor 230. The push button 242 also can act as a light guide by being illuminated by an LED next to the reset switch 240. The bezel 150 includes a plurality of sensor openings for corresponding sensors, such as the thermal sensor 210, the sound sensor 220 and the light sensor 230. The lens 232 is also retained in the sensor opening for the light sensor 230. The bezel 150 and its body parts will be described below in further detail with reference to FIGS. 3-10.

The cover 110 includes a plurality of openings for the various sensors on the PCB 200 and their associated components, as well as for other components on the PCB 200. For example, the cover includes a bezel opening 122 for receiving a portion of the bezel 150 and its associated sensors on the PCB 200, a button opening 124 for the reset switch/light guide 240 and its associated button 242, and a motion sensor opening 126 for the motion sensor 250 and its associated lens 252. When the components of the multi-sensor device 100 are assembled with the bezel 150 sandwiched between the cover 110 and the PCB 200, the bezel 150 or surfaces on bezel body form a seal(s) with surfaces of the cover 110 and the PCB 200 and its components and acts as a gasketing body. The bezel 150 also can provide dampening of unwanted vibrations. Thus, the bezel 150 can provide a gasketing effect and vibration dampening effect to protect at least selected components of the multi-sensor device (e.g., thermal sensor 210, sound sensor 220, light sensor 230 and other components), as well as other components in the multi-sensor device 100. The use of the bezel 150 provides a cost effective and efficient approach for protecting components of the multi-sensor device 100 from intrusion of unwanted materials and/or exposure to unwanted vibration.

Figures 3, 4:
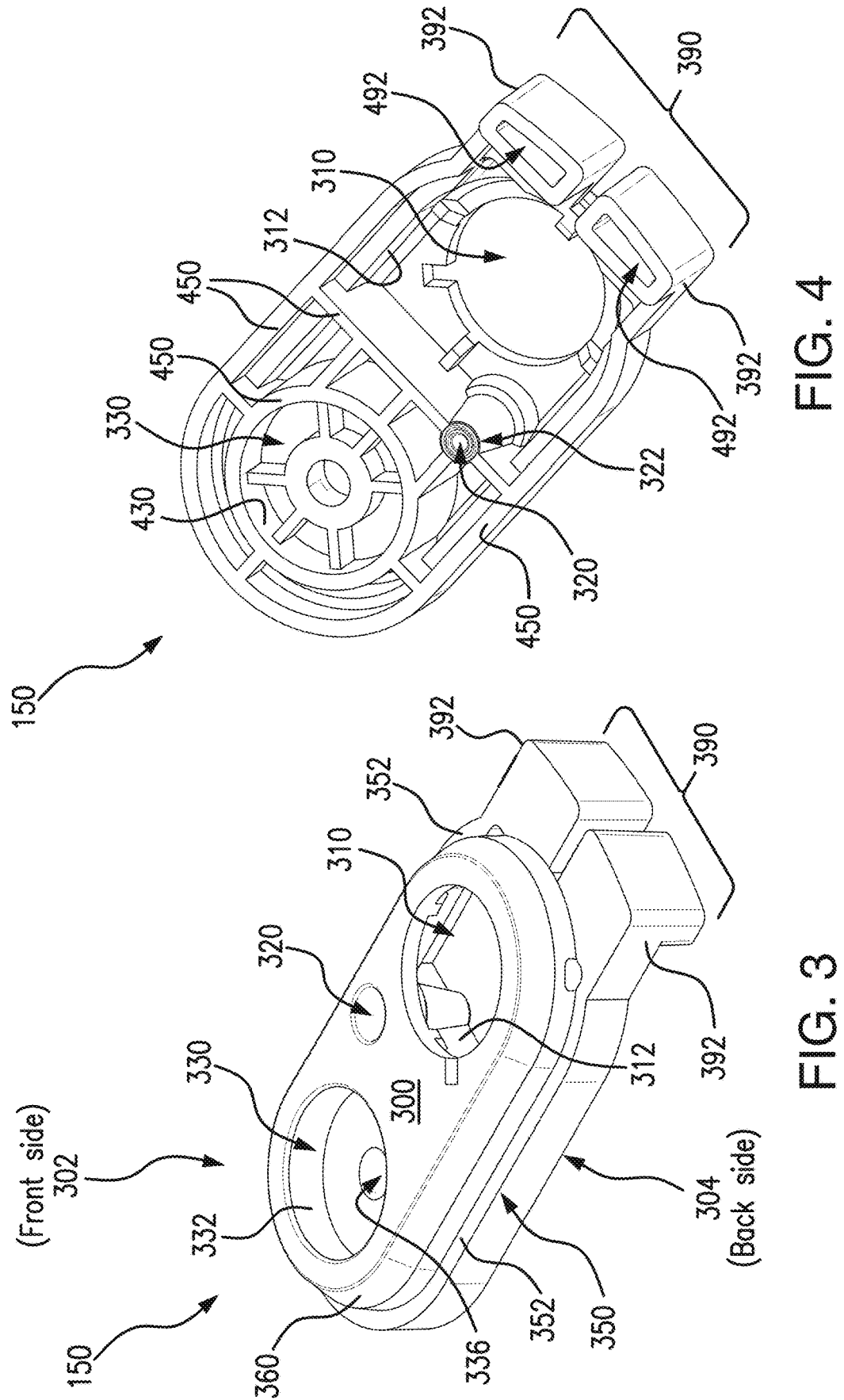
FIG. 3 is a perspective front view of the bezel of the housing assembly for the multi-sensor device of FIG. 1, in accordance with an embodiment.
FIG. 4 is a perspective back view of the bezel of the housing assembly for the multi-sensor device of FIG. 1, in accordance with an embodiment.

FIGS. 3 and 4 are perspective front and back views, respectively, of the bezel 150 of the housing assembly for the multi-sensor device 100, in accordance with an embodiment. The bezel 150 includes a body 300, with a front side 302 to be arranged adjacent the cover 110 and a back side 304 to be arranged adjacent the PCB 200 (e.g., example in FIG. 2). The body 300 can be soft, flexible and/or resilient, and be formed of a material, such as thermoplastic elastomer or other rubber/rubber-like material. In an embodiment, the body 300 can be formed of a material having an elastic modulus at or around 85 Shore D hardness. Furthermore, the body 300 can be formed as a single-piece or unitary-piece, such as using molding or other well-known manufacturing techniques.

As shown in FIGS. 3 and 4, the body 300 includes a plurality of openings for components of the multi-sensor device 100. The openings may be configured with the desired size, shape and/or dimension according to the requirements of the components, such as sensors on a PCB (e.g., 200). In this example, the plurality of openings include a thermal sensor opening 310 for a thermal sensor (e.g.,

210), a sound sensor opening 320 for a sound sensor (e.g., 220) and a light sensor opening 330 for a light sensor (e.g., 230).

The thermal sensor opening 310 includes a body cavity 312, which has a size, shape and/or dimension to receive the thermal sensor. When the thermal sensor is arranged in the body cavity 312 of the opening 310, the body 300 or surfaces thereof form a seal with portions of the thermal sensor to prevent unwanted materials from entering into the housing of the multi-sensor device. The body 300 or surfaces thereof can also form a seal with the PCB around the thermal sensor.

The sound sensor opening 320 has a size, shape and/or dimension for directing sound or sound waves to the sound sensor. In this example, the sound sensor opening 320 has a cone-shape and tapers from the front side 302 to the back side 304 of the body 300. The cone-shape opening can form a sound cone to capture and relay sound waves more efficiently to the sound sensor, such as for example by capturing and amplifying sound waves and directing them toward the sound sensor. On the back side 304 (or base of the body 300), one or more gasket (or gasketing) rings 322 can be formed at or around the entrance of the opening 320. The gasket ring(s) 322 can form a seal around the sound sensor, and dampen unwanted vibrations around the sound sensor to improve sound detection by the sensor.

For example, for sound metering, the gasket ring(s) 322 can be molded or embossed on the back side (or base) of the body 300 of the bezel 150 at a base of the sound cone, with a design to compress tightly around the sound sensor orifice (e.g., microphone orifice) providing a dampening effect against unwanted vibrations. The gasket rings can accommodate fluctuations in tolerance stack-up. For example, plastic and PCB thickness can vary depending on manufacturing tolerances and/or exposure to hot/cold temperatures. The flexible rings can be designed to move (e.g., compress and relax) as these conditions vary insuring a tight fit against the PCB at all times regardless of condition. Accordingly, in operation, the gasket ring(s) 322 can compress but also can move with tolerances as the material of the gasket ring(s) 322 expands and contracts to ensure vibrations remain absorb/minimized around the sound sensor at all times resulting in improved performance. In this example, the gasket ring(s) 322 are formed as part of the body 300. Although the gasket ring is described with reference to a sound sensor in this example, the gasket ring feature can be employed on the body of the bezel for use with any type of sensor or component to dampen vibrations.

As further shown in FIGS. 3 and 4, the light sensor opening 330 includes a body cavity 332 for receiving and retaining a lens (e.g., the lens 232) on the front side 302 of the body 300, and a through-hole 336 arranged below the cavity 332. The light sensor opening 330 also includes a body cavity 430 on the back side 304 for receiving a light sensor or portion thereof. The through-hole 336 can be a field of view (FOV) hole, which has a size, shape and/or dimension configured to control an amount of light (e.g., ambient light) to be received through the lens by the light sensor. In this example, the hole 336 is positioned in the center of the opening 330. To retain the lens in the cavity 332, one or more small extending stops (e.g., extending portions or flange(s) (protruded lip or ridge) protruding along the perimeter of the entryway) may be provided on the body 300 at the front entrance to the opening 330.

The body 300 of the bezel 150 also includes a projecting edge 350 (e.g., extending edge, rim, flange, etc.), with a ledge 352 on the front side 302 of the body 300. In this example, the ledge 352 runs substantially around the body 300. The body 300 also includes a protrusion (or protruding or raised portion) 360 on the front side 302. The protrusion 360 includes the plurality of openings 310, 320 and 330, and has a size, shape and/or dimension configured according to the bezel opening 122 of the cover 110 (e.g., in FIG. 2). In this example, the protrusion 360 has an oval-shape, and can have a beveled edge or taper towards the front side 302 of the body 300 (in relation to the back side 304).

On the back side 304 of the body 300, there are plurality of gasketing surfaces 450 running along the edge of the body 300 and across the body 300. The gasketing surfaces 450 are designed to form a seal when pressed against the surface of the PCB 200 to create enclosed regions, such as, for example, around the thermal sensor 210 and the light sensor 230 of the PCB 200.

The body 300 of the bezel 150 also can include poka-yoke components for ease of installation or assembly in the multi-sensor device 100. In this example, the body 300 includes keying component(s) 390 at one end of the body 300, closest to the thermal sensor opening 310. The keying component 390 can include at least one plug 392 which may have a slot 492. The plug 392 can be a leg-or finger-like extension or protrusion from an end of the body 300. In this example, the keying component 390 includes a pair of plugs 392. As will be described further below with reference to FIGS. 7 and 8, the keying components 390 of the body 300 are configured to engage a counter keying component in the housing assembly, such as for example in a base (e.g., base 140) of the multi-sensor device 100 to facilitate poka-yoke assembly of the bezel 150 onto the housing assembly (or components thereof) and the PCB 200 and its components (e.g., sensors 210, 220 and 230). The poka-yoke feature of the bezel 150 can provide the ability to self-locate or align itself when installed, e.g., locating the selected openings over each sensor component to prepare the bezel 150 to be received/pre-aligned with the cover 110 as the cover 110 is mated with the base 140.

Figure 9:
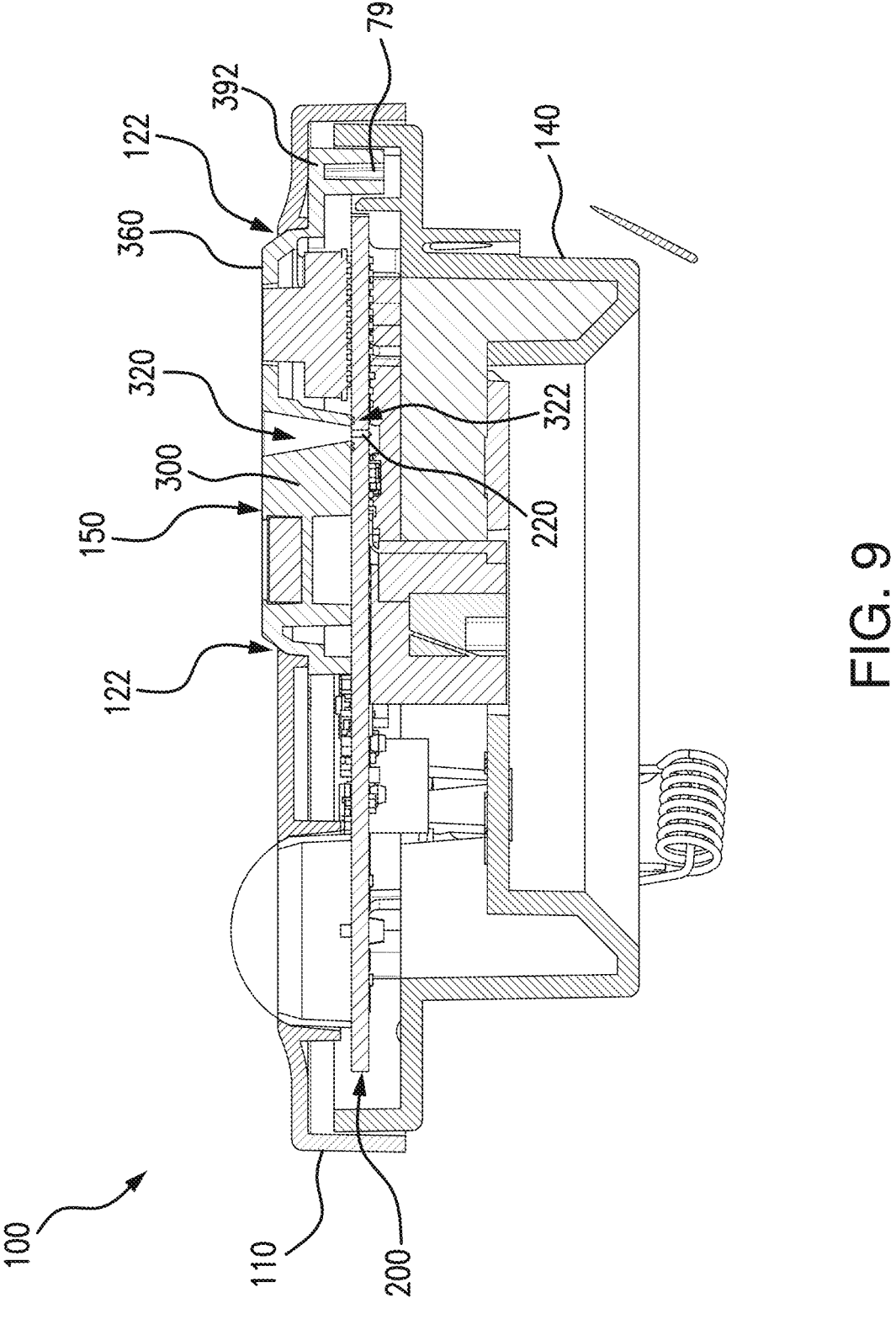
FIG. 9 is a cross-sectional view along section line 9-9 of the multi-sensor device of FIG. 1 showing the bezel along with other components of the device, in accordance with an embodiment.
Figure 10:
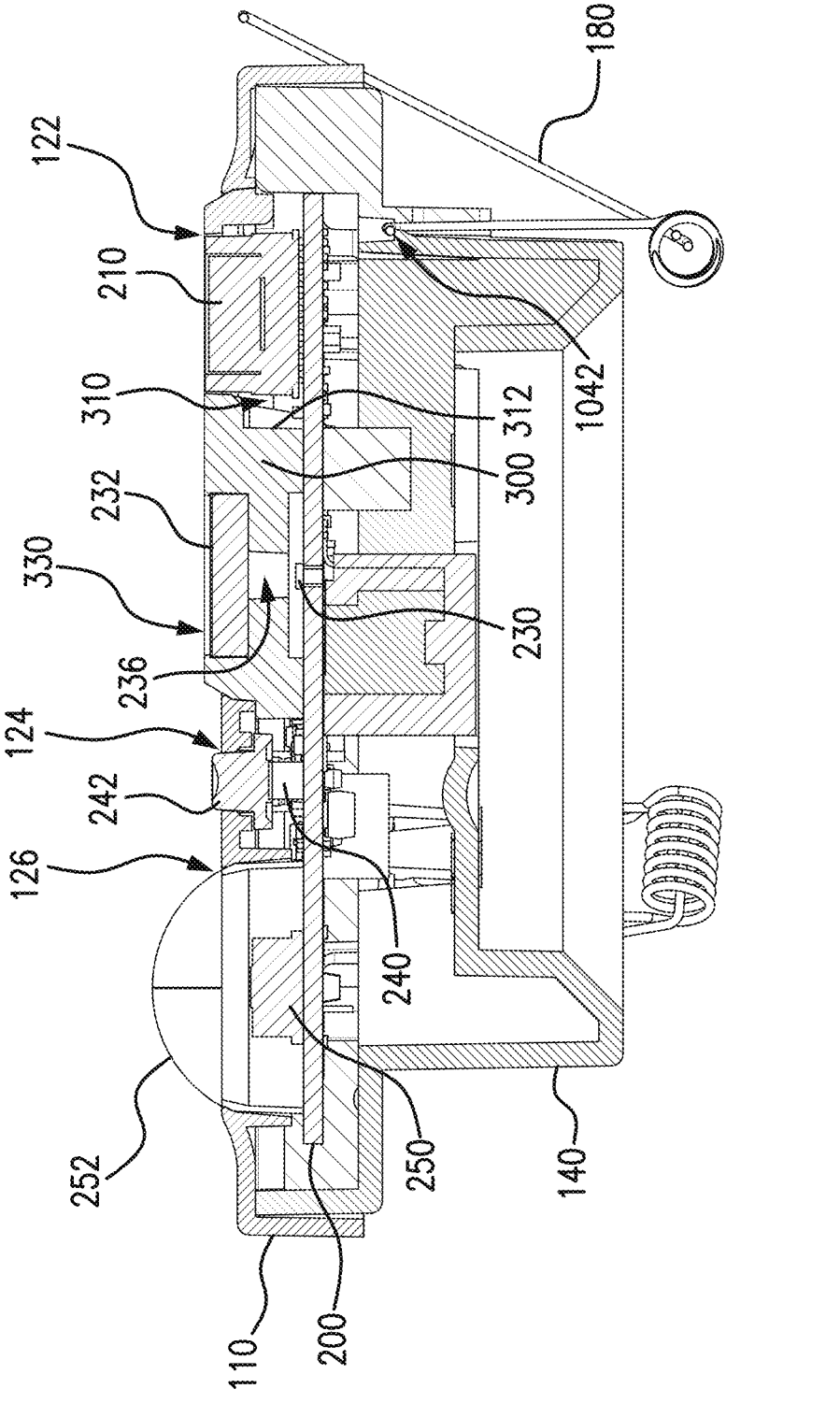
FIG. 10 is a cross-sectional view along section line 10-10 of the multi-sensor device of FIG. 1 showing the bezel along with other components of the device, in accordance with an embodiment.

When the bezel 150 is sandwiched between the cover 110 and the PCB 200, the protrusion 360 of the body 300 or portion thereof is configured to extend through the bezel opening 122 with a back surface of the cover 110 around the bezel opening 122 engaging or sitting on the ledge 352 (e.g., as shown in FIGS. 1, 9 and 10). The soft, flexible and/or resilient characteristic of the body 300 allows the shape of the body 300 or portions thereof to adapt when pressed against surfaces of the cover 110, the PCB 200, and components on the PCB 200 to form a seal therebetween.

Although the bezel 150 is shown as having three sensor openings, the bezel can be configured with any number of component openings. The openings can be configured in size and shape, as well as number of cavities, according to the component requirements. The size, shape and/or dimension of the body of the bezel can be configured to protect selected components of the multi-sensor device 100.

Figures 5, 6:
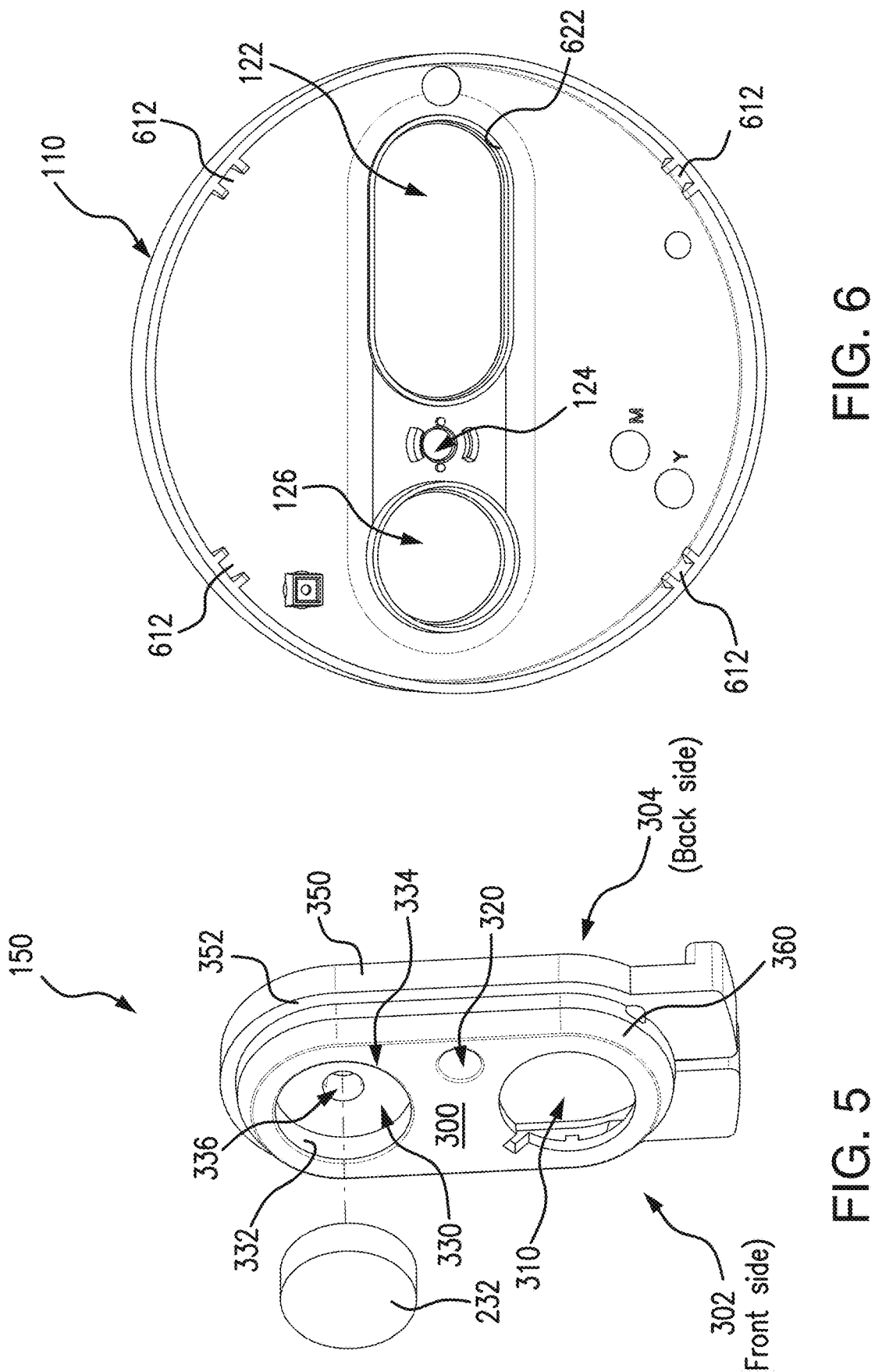
FIG. 5 is a perspective front view of the bezel of the housing assembly for the multi-sensor device of FIG. 1 with a lens for a sensor opening of the bezel, in accordance with an embodiment.
FIG. 6 is a back view of a cover of the housing assembly for the multi-sensor device of FIG. 1, in accordance with an embodiment.

FIG. 5 is a perspective front view of the bezel 150 of the housing assembly for the multi-sensor device 100 of FIG. 1. As shown in FIG. 5, the lens 232 can be pressed into and received in the body cavity 332 of the light sensor opening 330. As previously explained, to retain the lens in the cavity 332, one or more small extending stops (e.g., extending portions or flange(s) (protruded lip or ridge) protruding along the perimeter of the entryway) may be provided on the body 300 at the front entrance of the rim of the opening 330.

For ambient light monitoring, the lens 232 can be a crystal clear polycarbonate lens, which can be pressed into the body cavity 332 of the light sensor opening 330 of the body 300 of the bezel 150 creating, for example, an over-mold like retention. The crystal clear polycarbonate lens can have a refractive index which bends the light at a specific angle down to the light sensor (e.g., an ambient light sensor (ALS)). Based on calculations and testing, the lens can be set into body 300 of the bezel 150 at a set depth to maintain a specific distance from the light sensor.

Underneath the lens 232, the body 300 can have a through-hole 336 (also referred to as a field of view (FOV) hole) in the light sensor opening 330. In this example, the through-hole 336 can be a molded-round hole, which is formed with a set diameter size that can be calculated beforehand to allow a desired percentage of ambient light to enter the light sensor opening 330 and be received by a light sensor arranged behind the hole 336. The through-hole 336 can be centered above the position of the light sensor, when the bezel 150 is aligned and assembled on the PCB 200. Accordingly, in various embodiments, a specific amount of light to be received and measured by a light sensor can be controlled through configuration of the lens 232 and/or through-hole 336.

FIG. 6 is a back view of the cover 110 of the housing assembly for the multi-sensor device 100. As shown in FIG. 6, the cover 110 includes the bezel opening 122, button opening 124, and motion sensor opening 126. In this example, the edge of the body 300 forming the bezel opening 122 can include an extending portion 622 (e.g., rim, etc.) running around the bezel opening on the back side of the cover 110. The extending portion 622 can be configured to engage the ledge 352 (e.g., in FIG. 5) on the front side 302 of the body 300 of the bezel 150, when the bezel 150 is sandwiched between the cover 110 and the PCB 200.

Figure 7:
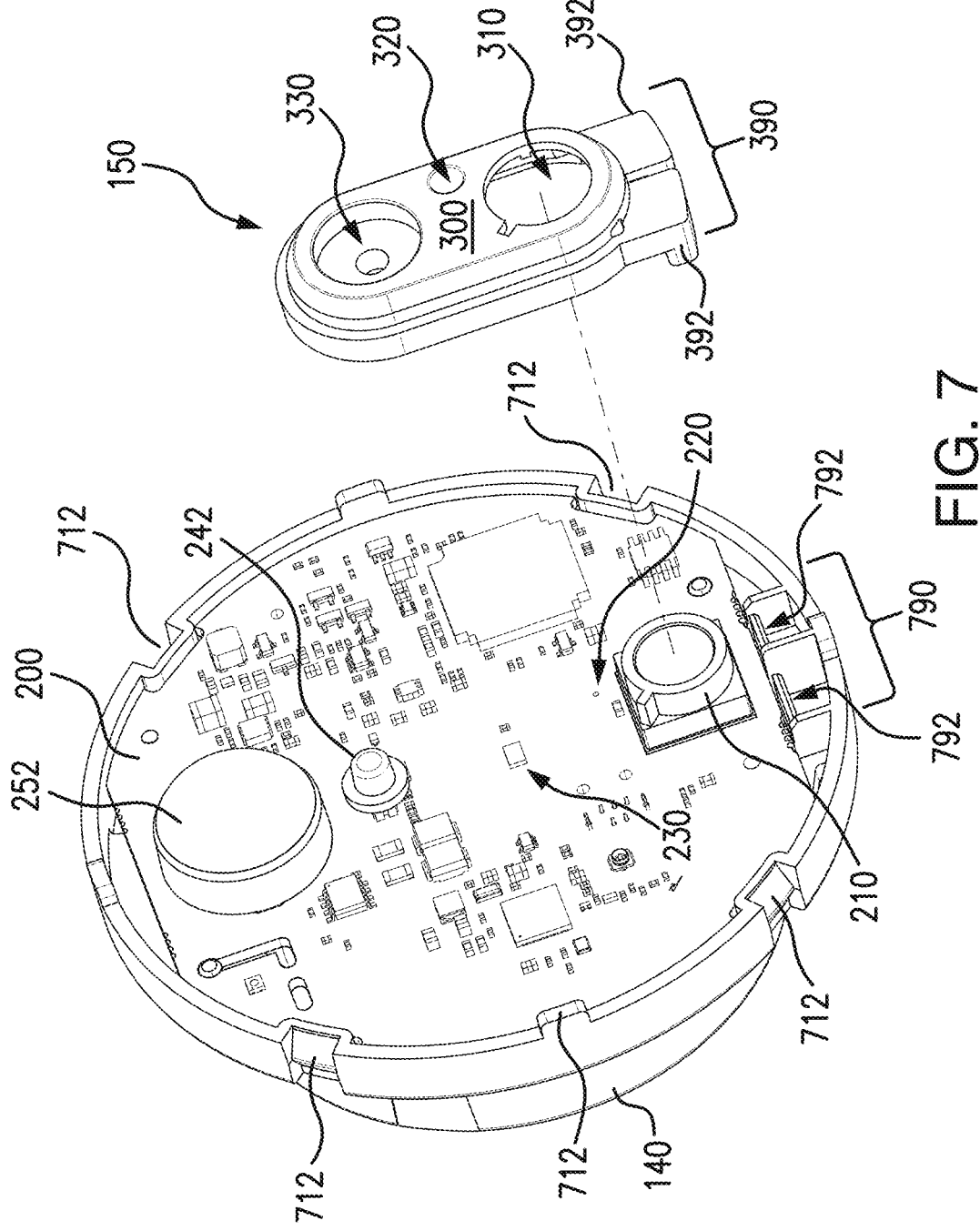
FIG. 7 is a perspective front view of a printed circuit board (PCB) and the bezel of the housing assembly for the multi-sensor device of FIG. 1, in accordance with an embodiment.

As further shown in FIG. 6, the cover 110 also can include one or more tabs 612, which can be spaced-apart around an edge of the cover 110. The tabs 612 can be configured to receive corresponding slots 712, as shown in FIG. 7, on the base 140 of the housing assembly of the multi-sensor device 100, when the parts of the housing are assembled together. For example, the tabs 612 can be latched to corresponding slots 712. They also can help align the cover 110 to the base 140 and prevent the cover 110 from rotating along a circumference of the base 140.

Figure 8:
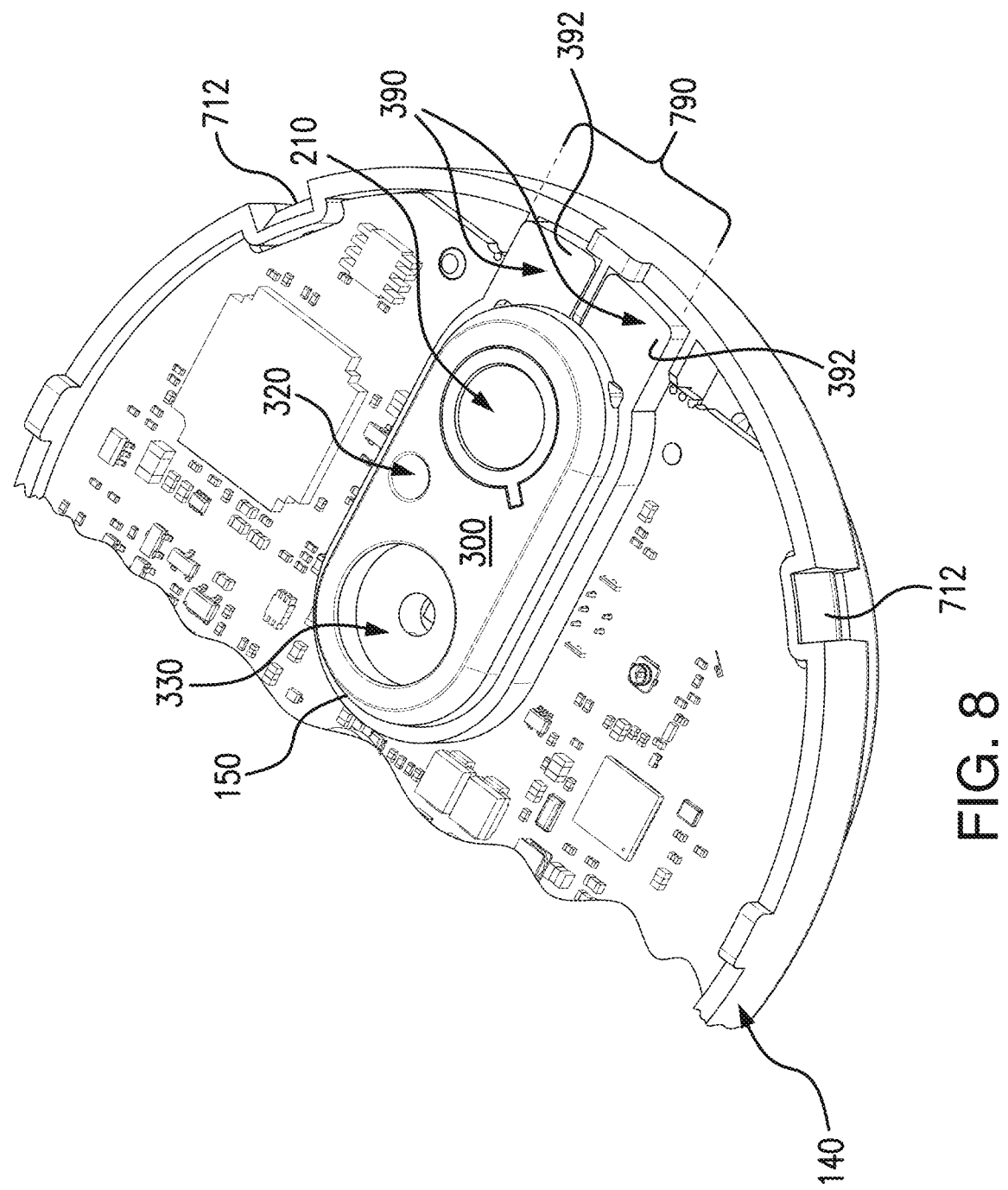
FIG. 8 is a perspective front view of the bezel arranged on the printed circuit board of the multi-sensor device of FIG. 1, in accordance with an embodiment.

FIGS. 7 and 8 show the PCB 200 and the bezel 150 of the housing assembly for the multi-sensor device 100 before assembly and after assembly of the bezel 150 onto the PCB 200, respectively. As shown in FIG. 7, the PCB 200 is housed in the base 140. The base 140 includes counter keying component 790, which can include at least one male receptacle 792 with a tab or prong. In this example, the counter keying component 790 includes a pair of receptacles 792, which are configured to receive and engage corresponding plugs 392 of the keying component 390 of the body 300 to facilitate poka-yoke assembly of the bezel 150 onto the base 140 and the PCB 200 (and its components).

When the keying component 390 of the body 300 is engaged to the counter keying component 790 of the base 140, the body 300 is positioned on the PCB 200 with the thermal sensor opening 310, sound sensor opening 320 and light sensor opening 330 aligned with the thermal sensor 210, sound sensor 220 and light sensor 230, respectively, on the PCB 200, as shown in FIG. 8.

For example, the poka-yoke assembly with the keying components allows the body 300 of the bezel 150 to be pressed into base 140, keying the bezel 150 in one direction and guiding and retaining the bezel 150 to rest on top of the PCB 200 prior to the cover 110 being installed. When the cover 110 is installed over the bezel 150, the poka-yoke assembly dials in the precise alignment of the bezel 150 for its final resting place, ensuring a snug fit at all times during the life of the product.

FIG. 9 is a cross-sectional view along section line 9-9 of an assembled multi-sensor device 100 of FIG. 1 showing the bezel 150 along with other components of the device, in accordance with an embodiment. As shown in FIG. 9, the PCB 200 and its components are housed and supported in the base 140, and a portion of the body 300 of the bezel 150 is sandwiched between the cover 110 and the PCB 200 with the protrusion 360 of the body 300 extending through the bezel opening 122 of the cover 110. The body 300 of the bezel 150 includes a keying component, such as a plug 392, which is engaged with a corresponding receptacle 792 of the counter keying component on the base 140. The cover 110 (and its extending rim) encircles and extends over the edge of the base 140.

As further shown in FIG. 9, the sound sensor opening 320 of the body 300 of the bezel 150 can have a cone-shape, which tapers from the front side to the back side of the body 300. As previously discussed, the cone-shape can capture, amplify and direct sound waves to the sound sensor 220. Furthermore, the body 300 can include gasket ring(s) 322, on the back side of the sound sensor opening 320, which can form a seal against the PCB 200 around the sound sensor 220 or component(s) thereof, and dampen unwanted vibrations around the sound sensor 220.

FIG. 10 is a cross-sectional view along section line 10-10 of the multi-sensor device 100 of FIG. 1 showing the bezel 150 along with other components of the device, in accordance with an embodiment. As shown in FIG. 10, the PCB 200 and its components are housed and supported in the base 140, and a portion of the body 300 of the bezel 150 is sandwiched between the cover 110 and the PCB 200 with the protrusion 360 of the body 300 extending through the bezel opening 122 of the cover 110. The base 140 can include one or more recesses or slots 1042 for receiving a corresponding mounting spring 180 for mounting the multi-sensor device on a structure, such as a wall (e.g., side wall or ceiling, etc.) or other structure.

As further shown in FIG. 10, the thermal sensor 210 (e.g., a thermal imager) is arranged in the thermal sensor opening 310 of the body 300, with a seal formed between the thermal sensor 210 and the body 300 to prevent unwanted materials from entering into the housing of the multi-sensor device 100 through the thermal sensor opening 310. A seal also can be formed by a base or back side of the body 300 with the PCB 200 around the thermal sensor 210. In various embodiments, the seals formed by the body 300 can provide a temperature regulating gasket to insulate the thermal sensor 210 and regulate a temperature at or around the sensor to facilitate temperature calibration of the thermal sensor when the thermal sensor is arranged in the body cavity 312 of the body 300. For example, the temperature regulating gasket can provide insulation properties, which can isolate the air temperature around the thermal sensor 210, so accurate measurements of the actual sensor operating temperature can be taken versus the surrounding environment temperature in a room or other location during calibration. A temperature sensor can be provided on the PCB 200 on or around the thermal sensor or other suitable location, and used to take temperature measurements to calibrate the thermal sensor. Although the temperature regulating gasket feature is described with reference to a thermal sensor, it can be employed with any sensor used, in combination with the bezel, which may require some form of temperature calibration or insulation.

Furthermore, the light sensor 230 (e.g., an ambient light sensor) is arranged in the light sensor opening 330 of the body 300 below the FOV hole 236 to receive light which passes through the lens 232. The lens 232 is received and retained in a cavity in the light sensor opening 330, and forms a seal with the body 300 to prevent unwanted materials from entering into the housing of the multi-sensor device 100 through the light sensor opening 330. A seal also can be formed by a base or back side of the body 300 with the PCB 200 around the light sensor 230.

Furthermore, in FIG. 10, the button 242 is arranged over or on the reset switch/light guide 240, and has a portion that extends through the button opening 124 of the cover 110. The lens 252 (e.g., a Fresnel lens) is arranged over the motion sensor 250 (e.g., IR sensor, etc.), and has a portion that extends through the motion sensor opening 126 of the cover 110.

Figure 11:
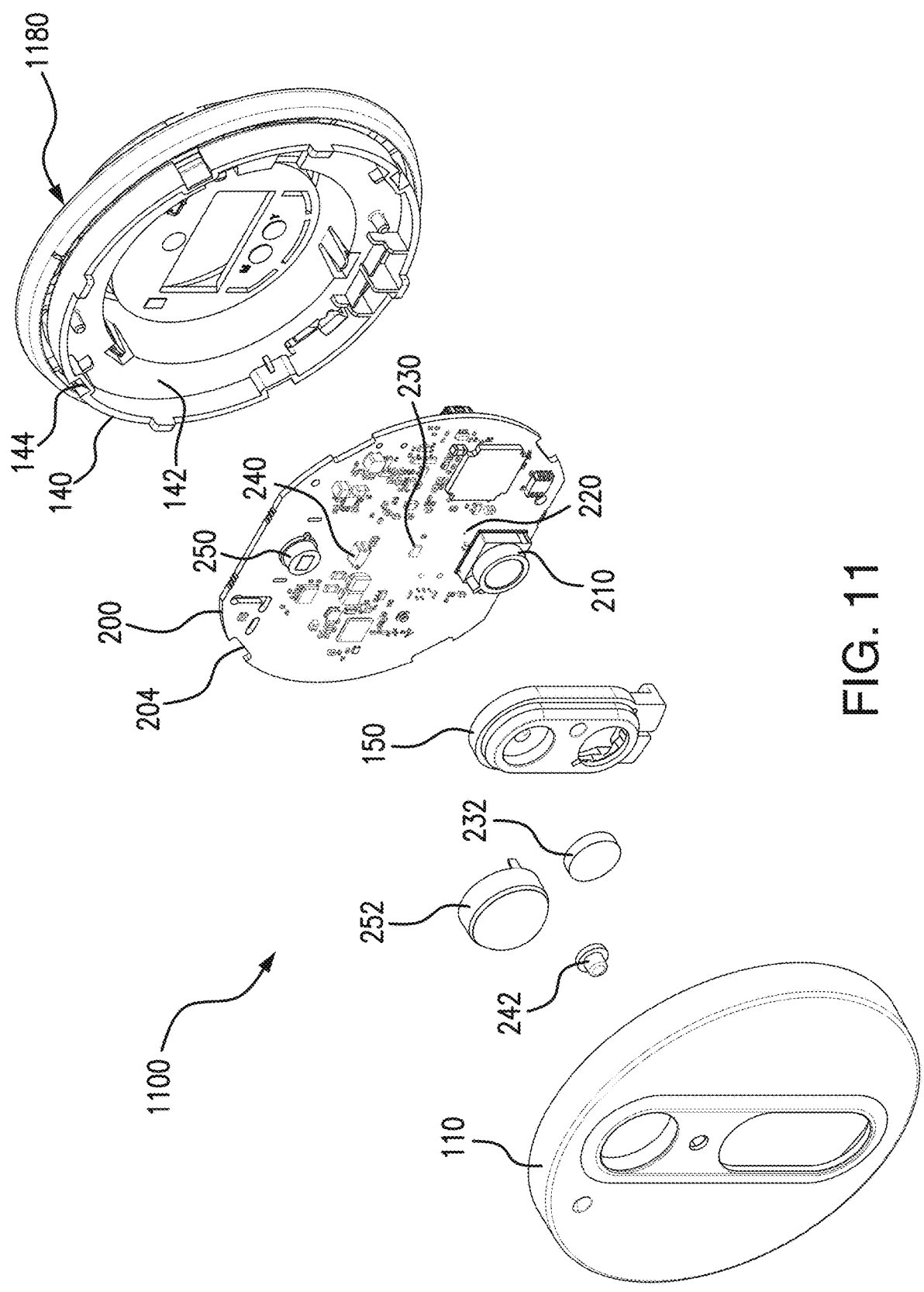
FIG. 11 is an expanded view of example components of a multi-sensor device with a housing assembly including a bezel and a ring mounted assembly, in accordance with a further embodiment.

FIG. 11 is an expanded view of example components of a multi-sensor device 1100 with a housing assembly including a bezel. The components of the multi-sensor device 1100 are the same or similar to the multi-sensor device 100, except that the multi-sensor device 100 includes a ring mounted assembly 1180 for mounting the multi-sensor device 1100 to a structure, such as a junction/gang/wall box, ceiling, ceiling tile/panel, or side wall, etc. The ring mounted assembly 1180 can include one or more small notches on a ring of the assembly that can indicate a final position/ direction of the sensor(s) of the multi-sensor device (e.g., as shown in FIG. 12) after turning sensor in a lock position on the ring.

The ring mounted assembly 1180 can be used for mounting the multi-sensor device 1100 on a direct ceiling or wall, even though the mounting spring assembly (e.g., in FIG. 1) may be preferable in this situation. The ring mounted assembly 1180 also can be used to mount the multi-sensor device 1100 to a junction/gang/wall box or the like (e.g., a four-inch octagon box or EU wall box). For example, installers can hang such a box(es) in open plenum spaces and mount a multi-sensor device(s) respectively to them.

Figure 12:
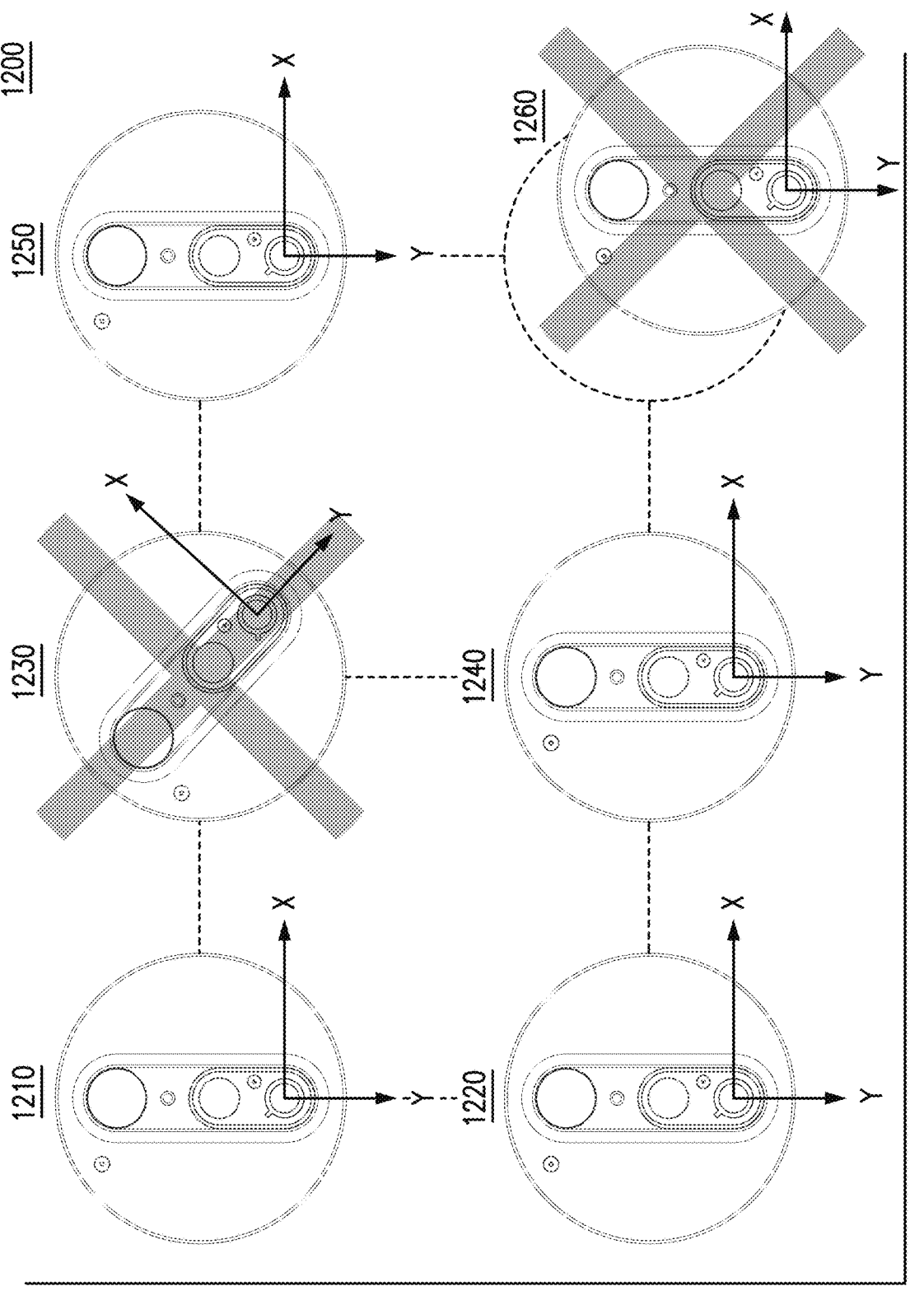
FIG. 12 illustrates an example of the use of a visual centerline feature of the multi-sensor device for installing a plurality of multi-sensor devices, in accordance with an embodiment.

FIG. 12 illustrates an example 1200 of the visual center-line feature of the multi-sensor device (e.g., 100, 1100), which can be used to facilitate installation of a plurality of multi-sensor devices on one or more structures, in accordance with an embodiment. For example, various components, such as the sensors (or their associated component(s)) and/or button, are arranged in-line on the cover to provide a visual center-line for use in installation. In this example, the sensors such as the thermal sensor (e.g., 210), light sensor (e.g., 230), button (e.g., 242) and lens 252 for the motion sensor 250 or their associated components are arranged in-line on the cover to provide the center-line feature.

When installing a plurality of multi-sensor devices on one or more structures, the centerline feature can assist the installer in aligning the devices in relation to one another. For example reference numbers 1210, 1220, 1240 and 1260 show devices which are in alignment, and reference numbers 1230 and 1260 show devices which are not properly aligned.

Furthermore, the material of the body of the bezel (e.g., 150) can have a color which can help to camouflage the sensors or their associated components (e.g., lens(es)) arranged in the sensor openings of the bezel, when viewed for example from a distance. In an embodiment, the color can be black or a dark color. In this way, the sensors (e.g., thermal sensor 210, sound sensor 220 and light sensor 230) or their associated components can be tied together into one element while keeping them discrete when installed on a structure, such as a wall (e.g., side wall or ceiling, etc.).

The above describes various non-limiting examples of a multi-sensor device(s) and its components. It should be understood that various aspects of the multi-sensor device and its components may be modified. By way of additional non-limiting examples, the various components of the multi-sensor device, including but not limited to the cover, base, PCB or other components housed in the housing assembly, can be connected or interconnected using various connector assemblies (e.g., Snap-On assembly, tongue and groove, tab and slot, fasteners, etc.). The connector assemblies can be poka-yoke type assemblies to facilitate ease of assembly. The multi-sensor device described herein also can employ different types and combinations of sensors/sensor devices or electronic devices, and the bezel can include any number of openings (e.g., openings, through-holes, slots, etc.) which have a size, shape and/or dimension suitable to meet requirements of the electronic components to be arranged therein from the PCB. The size, shape and dimension of the bezel, including the number of openings and cavities, can be configured to protect in a selective manner particular regions, or sensors and/or other components (e.g., the more sensitive electronic or non-electronic components) in a system or unit. The bezel can be employed with different types, numbers and/or combinations of sensors and/or other components.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "front", "back", "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A bezel for a multi-sensor device having a cover and a printed circuit board including a plurality of sensors, the bezel comprising:
   a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the plurality of openings includes at least one opening for a light sensor with the at least one opening having a body cavity configured to receive a lens to retain the lens within the at least one opening.

2. The bezel according to claim 1, wherein the body includes one or more gasket rings defining an end of a sound sensor opening from the plurality of openings on the second side, the one or more gasket rings being configured to surround a sound sensor from the plurality of sensors on the printed circuit board and to dampen unwanted vibrations around the sound sensor.

3. A bezel for a multi-sensor device having a cover and a printed circuit board including a plurality of sensors, the bezel comprising:
   a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the body includes one or more gasket rings defining an end of a sound sensor opening from the plurality of openings on the second side, the one or more gasket rings being configured to surround a sound sensor from the plurality of sensors on the printed circuit board and to dampen unwanted vibrations around the sound sensor,
   wherein the sound sensor opening has a cone-shape which tapers from the first side to the second side, the cone-shape of the sound sensor opening being configured to direct and amplify sound to the sound sensor.

4. A bezel for a multi-sensor device having a cover and a printed circuit board including a plurality of sensors, the bezel comprising:
   a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the body includes a projecting edge or flange and a front protrusion on the first side, the front protrusion including the plurality of openings and being configured to extend through a bezel opening on the cover, the projecting edge or flange being configured to engage a back portion of the cover around the bezel opening to form a seal therebetween.

5. The bezel according to claim 4, wherein the front protrusion and the bezel opening have an oval-shape.

6. A bezel for a multi-sensor device having a cover and a printed circuit board including a plurality of sensors, the bezel comprising:

a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the body includes a temperature regulating gasket defining one of the plurality of openings, the temperature regulating gasket regulating a temperature around a thermal sensor from the plurality of sensors which is arranged in the one of the plurality of openings in order to facilitate temperature calibration of the thermal sensor when the temperature regulating gasket is engaged against the printed circuit board around the sensor.

7. The bezel according to claim 1, wherein the body is made of a thermoplastic elastomer or rubber-like material.

8. The bezel according to claim 1, wherein each of the plurality of openings has a different size and shape for a different-type of sensor.

9. The bezel according to claim 1, wherein the plurality of openings further includes at least an opening for a sound sensor and an opening for a thermal sensor.

10. A bezel for a multi-sensor device having a cover and a printed circuit board including a plurality of sensors, the bezel comprising:

a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the plurality of openings includes at least an opening for a sound sensor, an opening for a thermal sensor and an opening for a light sensor, wherein the opening for the light sensor has a size and shape which is configured to receive and retain a lens therein over a light sensor from the plurality of sensors, the opening for the light sensor further including a field of view through-hole, positioned under the lens, which has a size and shape to control an amount of light to be received by the light sensor.

11. The bezel according to claim 1, wherein the body further comprises a keying or poka-yoke component for alignment when assembling the body of the bezel in a housing of the multi-sensor device.

12. A multi-sensor device comprising:

a housing assembly including a cover plate having at least a first cover opening;

a printed circuit board including a plurality of sensors arranged at different locations on the printed circuit board; and a bezel comprising a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the bezel has a protrusion which includes the plurality of openings for the plurality of sensors and extends through the first cover opening, the bezel being configured to form a seal with the cover plate, and with the printed circuit board and/or one or more of the plurality of sensors.

13. A multi-sensor device comprising:

a housing assembly including a cover plate having at least a first cover opening;

a printed circuit board including a plurality of sensors arranged at different locations on the printed circuit board; and a bezel comprising a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the housing assembly further includes a base for housing the printed circuit board, and wherein the bezel includes a keying component and the base includes a counterpart keying component for receiving the keying component of the bezel such that each of the plurality of openings is aligned with a respective sensor from the plurality of sensors on the printed circuit board when the keying component is engaged to the counterpart keying component.

14. The multi-sensor device according to claim 13, wherein the counterpart keying component comprises a receptacle with a male tab or prong, and the keying component comprises at least one plug for receiving the male tab or prong.

15. A multi-sensor device comprising:

a housing assembly including a cover plate having at least a first cover opening;

a printed circuit board including a plurality of sensors arranged at different locations on the printed circuit board; and a bezel comprising a soft, flexible or resilient body including a first side and a second side, and a plurality of openings for the plurality of sensors or components thereof, the plurality of openings extending between the first and second sides, the first side being adjacent to the cover and the second side being adjacent to the printed circuit board, wherein the cover plate further includes a second cover opening for an additional sensor and a third opening for a button or light guide, the additional sensor and/or the button or light guide being in-line with at least two sensors from the plurality of sensors to provide a visual center-line to facilitate installation on a wall or structure.

16. The multi-sensor device according to claim 12, wherein the bezel is colored to camouflage the plurality of sensors or components related thereto which are visible through the cover.

17. The multi-sensor device according to claim 12, wherein the body comprises a gasketing body, the gasketing body or portions thereof being configured to engage the cover and the printed circuit board or components thereof to form a seal therebetween, and wherein the gasketing body is further configured to dampen unwanted vibrations when sandwiched between the cover and printed circuit board.

18. The multi-sensor device according to claim 12, wherein the body includes a projecting edge or flange and a front protrusion on the first side, the front protrusion including the plurality of openings and being configured to extend through a bezel opening on the cover, the projecting edge or flange being configured to engage a back portion of the cover around the bezel opening to form a seal therebetween.

19. The multi-sensor device according to claim 12, wherein the body includes a temperature regulating gasket defining one of the plurality of openings, the temperature regulating gasket regulating a temperature around a thermal sensor from the plurality of sensors which is arranged in the one of the plurality of openings in order to facilitate temperature calibration of the thermal sensor when the temperature regulating gasket is engaged against the printed circuit board around the sensor.

20. The bezel according to claim 1, wherein the body comprises:

a gasketing body, the gasketing body or portions thereof being configured to engage the cover and the printed circuit board or components thereof to form a seal therebetween.

* * * * *